United States Patent
Wu et al.

(10) Patent No.: US 11,011,193 B1
(45) Date of Patent: May 18, 2021

(54) DUAL FLUX CHANGE LAYER (FCL) ASSISTED MAGNETIC RECORDING

(71) Applicant: Headway Technologies, Inc., Milpitas, CA (US)

(72) Inventors: Yan Wu, Cupertino, CA (US); Wenyu Chen, San Jose, CA (US); Shohei Kawasaki, Sunnyvale, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/781,631

(22) Filed: Feb. 4, 2020

(51) Int. Cl.
| | |
|---|---|
| *G11B 5/31* | (2006.01) |
| *G11B 5/39* | (2006.01) |
| *G11B 5/60* | (2006.01) |
| *G11B 5/127* | (2006.01) |
| *G11B 5/245* | (2006.01) |
| *G11B 19/20* | (2006.01) |
| *G11B 5/00* | (2006.01) |

(52) U.S. Cl.
CPC .......... *G11B 5/3912* (2013.01); *G11B 5/1278* (2013.01); *G11B 5/2455* (2013.01); *G11B 5/3133* (2013.01); *G11B 5/3146* (2013.01); *G11B 5/6082* (2013.01); *G11B 19/2009* (2013.01); *G11B 2005/0018* (2013.01)

(58) Field of Classification Search
None
See application file for complete search history.

(56) References Cited

U.S. PATENT DOCUMENTS

| 6,785,092 B2 | 8/2004 | Covington et al. |
| 6,809,899 B1 | 10/2004 | Chen et al. |

(Continued)

FOREIGN PATENT DOCUMENTS

| JP | 2002-133610 | 5/2002 |
| JP | 2002-298309 | 10/2002 |

(Continued)

OTHER PUBLICATIONS

PTO Office Action, U.S. Appl. No. 12/964,202, Applicant: Sasaki et al., dated Nov. 28, 2012, 11 pages.

(Continued)

*Primary Examiner* — Jefferson A Evans
(74) *Attorney, Agent, or Firm* — Saile Ackerman LLC; Stephen B. Ackerman

(57) ABSTRACT

A spin transfer torque reversal assisted magnetic recording (STRAMR) structure is disclosed wherein two flux change layers (FCL1 and FCL2) are formed within a write gap (WG) and between a main pole (MP) trailing side and trailing shield (TS). Each FCL has a magnetization that flips to a direction substantially opposing a WG field when a direct current of sufficient current density is applied across the STRAMR device thereby increasing reluctance in the WG and producing a larger write field output at the air bearing surface. A reference layer (RL1) is used to reflect spin polarized electrons that exert spin torque on FCL1 and cause FCL1 magnetization to flip. A second reference layer (or the MP or TS) is employed to reflect spin polarize electrons that generate spin torque on FCL2 and flip FCL2 magnetization. Non-spin polarization preserving layers and spin polarization preserving layers are also in the STRAMR structure.

26 Claims, 11 Drawing Sheets

(56) References Cited

U.S. PATENT DOCUMENTS

| | | | |
|---|---|---|---|
| 6,954,340 B2 | 10/2005 | Shukh et al. | |
| 7,009,812 B2 | 3/2006 | Hsu et al. | |
| 7,589,600 B2 | 9/2009 | Dimitrov et al. | |
| 7,724,469 B2 | 5/2010 | Gao et al. | |
| 7,835,111 B2 | 11/2010 | Flint et al. | |
| 7,957,098 B2 | 6/2011 | Yamada et al. | |
| 7,963,024 B2 | 6/2011 | Neuhaus | |
| 7,978,442 B2 | 7/2011 | Zhang et al. | |
| 7,982,996 B2 | 7/2011 | Smith et al. | |
| 8,027,110 B1 | 9/2011 | Yamanaka et al. | |
| 8,064,244 B2 | 11/2011 | Zhang et al. | |
| 8,068,312 B2 | 11/2011 | Jiang et al. | |
| 8,154,825 B2 | 4/2012 | Takashita et al. | |
| 8,203,389 B1 | 6/2012 | Zhou et al. | |
| 8,264,792 B2 | 9/2012 | Bai et al. | |
| 8,270,112 B2 | 9/2012 | Funayama et al. | |
| 8,295,008 B2 | 10/2012 | Sasaki et al. | |
| 8,310,787 B1 | 11/2012 | Sasaki et al. | |
| 8,320,079 B2 | 11/2012 | Iwasaki et al. | |
| 8,427,781 B1 | 4/2013 | Sasaki et al. | |
| 8,446,690 B2 | 5/2013 | Alex et al. | |
| 8,462,461 B2 | 6/2013 | Braganca et al. | |
| 8,477,452 B2 | 7/2013 | Sasaki et al. | |
| 8,493,687 B2 | 7/2013 | Sasaki et al. | |
| 8,582,240 B1 | 11/2013 | Chen et al. | |
| 8,582,241 B1 | 11/2013 | Yu et al. | |
| 8,604,886 B2 | 12/2013 | Nikonov et al. | |
| 8,634,163 B2 | 1/2014 | Tanabe et al. | |
| 8,749,919 B2 | 6/2014 | Sasaki et al. | |
| 8,767,347 B1 | 7/2014 | Sasaki et al. | |
| 8,792,210 B2 | 7/2014 | de la Fuente et al. | |
| 9,142,228 B2 | 9/2015 | Fujita et al. | |
| 9,230,571 B1 | 1/2016 | Chen et al. | |
| 9,275,672 B2 | 3/2016 | Shiroishi et al. | |
| 9,299,367 B1 | 3/2016 | Tang et al. | |
| 9,361,912 B1 | 6/2016 | Liu et al. | |
| 9,406,317 B1 | 8/2016 | Tang et al. | |
| 9,466,319 B1 | 10/2016 | Tang et al. | |
| 9,805,746 B1* | 10/2017 | Okamura | G11B 5/147 |
| 9,824,701 B2 | 11/2017 | Tang et al. | |
| 9,934,797 B2 | 4/2018 | Takahashi et al. | |
| 9,966,091 B2 | 5/2018 | Chen et al. | |
| 9,978,404 B2 | 5/2018 | Taguchi et al. | |
| 10,032,469 B2 | 7/2018 | Lim et al. | |
| 10,037,772 B2 | 7/2018 | Okamura et al. | |
| 10,090,007 B2 | 10/2018 | Zhu | |
| 10,121,497 B1 | 11/2018 | Takahashi et al. | |
| 10,210,888 B1 | 2/2019 | Li | |
| 10,366,714 B1* | 7/2019 | Olson | G11B 5/314 |
| 10,522,174 B1* | 12/2019 | Chen | G11B 5/3916 |
| 10,546,600 B1 | 1/2020 | Koizumi | |
| 10,559,318 B1 | 2/2020 | Chen | |
| 10,580,441 B1 | 3/2020 | Chen | |
| 10,699,731 B1 | 6/2020 | Wu | |
| 10,762,917 B1 | 9/2020 | Le | |
| 2002/0034043 A1 | 3/2002 | Okada et al. | |
| 2004/0150910 A1 | 8/2004 | Okada et al. | |
| 2005/0128637 A1 | 6/2005 | Johnston et al. | |
| 2005/0141137 A1 | 6/2005 | Okada et al. | |
| 2006/0044682 A1 | 3/2006 | Le et al. | |
| 2006/0087765 A1 | 4/2006 | Iwakura et al. | |
| 2006/0103978 A1 | 5/2006 | Takano et al. | |
| 2007/0177301 A1 | 8/2007 | Han et al. | |
| 2008/0013209 A1 | 1/2008 | Sasaki et al. | |
| 2008/0088972 A1 | 4/2008 | Sasaki et al. | |
| 2009/0059426 A1 | 3/2009 | Sasaki et al. | |
| 2009/0080106 A1 | 3/2009 | Shimizu et al. | |
| 2009/0128953 A1 | 5/2009 | Jiang et al. | |
| 2009/0296275 A1 | 12/2009 | Sasaki et al. | |
| 2010/0165517 A1 | 7/2010 | Araki et al. | |
| 2011/0211271 A1 | 9/2011 | Ng et al. | |
| 2012/0262821 A1* | 10/2012 | Taguchi | G11B 5/235 360/99.08 |
| 2012/0292723 A1 | 11/2012 | Luo et al. | |
| 2013/0062308 A1 | 3/2013 | Funayama et al. | |
| 2013/0215532 A1* | 8/2013 | Taguchi | G11B 5/3116 360/123.02 |
| 2014/0071562 A1 | 3/2014 | Chen et al. | |
| 2014/0177092 A1 | 6/2014 | Katada et al. | |
| 2014/0313616 A1 | 10/2014 | Kusukawa | |
| 2015/0043106 A1 | 2/2015 | Yamada | |
| 2015/0098150 A1 | 4/2015 | Chiu | |
| 2016/0035375 A1 | 2/2016 | Gao | |
| 2016/0218728 A1* | 7/2016 | Zhu | G11B 5/235 |
| 2017/0133044 A1 | 5/2017 | Lim et al. | |
| 2018/0075868 A1 | 3/2018 | Koui et al. | |
| 2019/0088275 A1 | 3/2019 | Narita | |
| 2019/0244635 A1* | 8/2019 | Goncharov | G11B 5/35 |
| 2019/0279666 A1 | 9/2019 | Freitag | |
| 2020/0152228 A1 | 5/2020 | Tang | |
| 2020/0176022 A1* | 6/2020 | Li | G11B 5/11 |
| 2020/0312354 A1 | 10/2020 | Wu | |
| 2020/0381012 A1* | 12/2020 | Chembrolu | G11B 5/1278 |

FOREIGN PATENT DOCUMENTS

| | | |
|---|---|---|
| JP | 2008-021398 | 1/2008 |
| JP | 2010-157303 | 7/2010 |

OTHER PUBLICATIONS

"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.

Microwave Assisted Magnetic Recording, by Jian-Gang Zhu et al., IEEE Transactions on Magnetics, vol. 44, No. 1, Jan. 1, 2008, pp. 125-131.

Nov. 13, 2012, Office Action issued in Japanese Patent Application No. 2011-149242, with English language translation, 4 pages.

Nov. 13, 2012, Office Action issued in Japanese Patent Application No. 2011-149243, with English language translation, 6 pages.

Nov. 13, 2012, Office Action issued in Japanese Patent Application No. 2011-149244, with English language translation, 6 pages.

"Spin-Torque Oscillator Based on Magnetic Tunnel Junction with a Perpendicularly Magnetized Free Layer and In-Plane Magnetized Polarizer," by Hitoshi Kubota, et al., 2013 The Japan Society of Applied Physics, Applied Physics Express 6 (2013) 103003, Sep. 27, 2013, pp. 1-3.

"High-Power Coherent Microwave Emission from Magnetic Tunnel Junction Nano-oscillators with Perpendicular Anisotropy," by Zhongming Zeng, et al, 2012 American Chemical Society, Jun. 4, 2012, vol. 6, No. 7, pp. 6115-6121.

Co-pending US Patent HT18-030, U.S. Appl. No. 16/546,387, filed Aug. 21, 2019, by Yan Wu, "Spin Transfer Torque Oscillator (STO) With Spin Torque Injection to a Flux Generating Layer (FGL) From Two Sides," 31 pages.

U.S. Notice of Allowance, U.S. Appl. No. 16/781,618, First Named Inventor: Yan Wu, dated Sep. 15, 2020, 11 pages.

U.S. Office Action, U.S. Appl. No. 16/781,618, Applicant: Wu, Yan, dated Jul. 7, 2020, 14 pages.

U.S. Notice of Allowance, U.S. Appl. No. 16/781,618, First named Inventor: Yan Wu, dated Jan. 12, 2021, 11 pages.

* cited by examiner

DUAL FLUX CHANGE LAYER (FCL) ASSISTED MAGNETIC RECORDING

RELATED PATENT APPLICATIONS

This application is related to the following: U.S. Pat. Nos. 10,325,618; 10,490,216; and Ser. No. 16/546,387, filed on Aug. 21, 2019; assigned to a common assignee, and herein incorporated by reference in their entirety.

TECHNICAL FIELD

The present disclosure relates to a design for a spin torque oscillation (STO) device that enables an improved scheme for spin transfer torque reversal assisted magnetic recording (STRAMR) wherein two FCLs also known as flux guiding layers are formed in a write gap (WG) between a main pole (MP) trailing side and a trailing shield (TS), and where a magnetization in each FCL flips to a direction substantially opposite to the WG magnetic field generated by write current as a result of spin torque generated by spin polarized electrons from an adjacent magnetic layer when a current (Ia) is applied between the MP and TS, and across the STO device thereby enhancing the MP write field at a given Ia current density compared with a STO having only one FCL with a flipped magnetization.

BACKGROUND

As the data a real density in hard disk drive (HDD) increases, write heads and media bits are both required to be made in smaller sizes. However, as the write head size shrinks, its writability degrades. To improve writability, new technology is being developed that assists writing to a media bit. Two main approaches currently being investigated are thermally assisted magnetic recording (TAMR) and microwave assisted magnetic recording (MAMR). The latter is described by J-G. Zhu et al. in "Microwave Assisted Magnetic Recording", IEEE Trans. Magn., vol. 44, pp. 125-131 (2008). MAMR uses a spin torque device to generate a high frequency field that reduces the coercive field of a medium bit thereby allowing the bit to be switched with a lower main pole field.

Spin transfer torque devices are based on a spin-transfer effect that arises from the spin dependent electron transport properties of ferromagnetic (FM)-spacer-FM multilayers. When a spin-polarized current passes through a magnetic multilayer in a CPP (current perpendicular to plane) configuration, the spin angular moment of electrons from a first FM layer (FM1) that are incident on a second FM layer (FM2) interacts with magnetic moments of FM2 near the interface between the FM2 and non-magnetic spacer. Through this interaction, the electrons transfer a portion of their angular momentum to FM2. As a result, spin-polarized current can switch the FM2 magnetization direction if the current density is sufficiently high. STO devices are also referred to as spintronic devices and have FM layers that may have a perpendicular magnetic anisotropy (PMA) component where magnetization is aligned substantially perpendicular to the plane of FM1 and FM2. However, unlike Magnetoresistive Random Access Memory (MRAM) where PMA is necessary to keep magnetization perpendicular to plane in a free layer and reference layer, for example, STO devices in MAMR and related applications have a sufficiently strong WG field to align magnetization in FM layers without requiring inherent large PMA in the layers.

MAMR typically operates with the application of a bias current across the STO device and between the TS and MP in order to apply spin torque on an oscillation layer (OL) so that the OL's oscillation generates a high radio frequency (RF) field. The RF field induces a precessional state and lowers the switching field needed to flip the magnetic moment in a bit in the recording medium. Simultaneously, a write field from the MP is applied from an air bearing surface (ABS) to the magnetic medium, and lower field strength is needed to write the bit because of the RF field assist. In spin-torque-assisted FCL reversal schemes, FCL magnetization flips to an opposite direction when the applied current across the STRAMR device is sufficiently large thereby increasing the WG reluctance, which causes a greater write field output. Both MAMR and spin transfer torque reversal assisted magnetic recording (STRAMR) typically require a relatively high current density ($>10^8$ $A/cm^2$) in order to apply a useful spin torque effect for generating a RF field or for FCL flipping. Since the required applied current for optimum FCL flipping is near the maximum value that can be tolerated to ensure good device reliability, there is a need to design an improved STRAMR scheme that operates with a considerable reduction in applied current density. Alternatively, a design is desirable that enables a greater degree of write field enhancement as a result of FCL magnetization flipping at a given current density.

SUMMARY

One objective of the present disclosure is to provide a STRAMR structure that enables a spin-torque-induced reversal effect on FCL magnetization to enhance the write field at a given bias current density.

A second objective of the present disclosure is to provide a STRAMR structure according to the first objective that is compatible with a write gap thickness of about 25 nm or less.

A third objective of the present disclosure is to provide a method of forming the STRAMR structure according to the first and second objectives.

According to the embodiments of the present invention, these objectives are achieved with a writer design having a STRAMR device formed between a main pole and a trailing shield, and within a WG. Leads from the MP and TS are connected to a direct current (DC) source that provides an applied current (Ia) across the STRAMR device during a write process.

According to a first embodiment, the STRAMR device has a stack of layers with a first non-spin polarization preserving layer (pxL1), a first FCL (FCL1), first spin polarization preserving layer (ppL1), first reference layer (RL1), second pxL (pxL2), second FCL (FCL2), second ppL (ppL2), and an optional (sacrificial) second reference layer (RL2) sequentially formed on a main pole (MP) tapered trailing side at the ABS. Spin polarized electrons transiting pxL1 and pxL2 will have their spin polarization randomized by spin flipping scattering. In ppL1 and ppL2, electrons will largely retain their spin polarization when traversing the ppL layers. Each flux change layer has a magnetization that is capable of being flipped if there is sufficient polarized electron current density in the FCL. RL1 and RL2 each have a magnetization that is substantially aligned with the WG field direction. RL2 is considered sacrificial since the layer may be partially or entirely removed during a stitching process that forms a STRAMR top surface, which is coplanar with an adjoining WG layer.

In the first embodiment, current (Ia) is applied from the TS to the MP (electrons proceed from the MP to TS). FCL1 and FCL2 have magnetizations m1 and m2, respectively, which are oriented in the WG magnetic field ($H_{WG}$) direction in the absence of an applied current, but flip to a direction substantially opposite to $H_{WS}$ when Ia current density is sufficiently large. Back scattered spin polarized electrons from RL2 (or the TS) apply spin torque to FCL2 to cause a m2 reversal while back scattered spin polarized electrons from RL1 apply spin torque to FCL1 to cause m1 to flip. Accordingly, there is greater reluctance in the WG, which forces more flux (greater write field) out of the MP when the write field is out of the ABS and into a magnetic medium.

In a second embodiment, the STRAMR stack of layers of the first embodiment is retained except the positions of layers are reversed so that RL2, ppL2, FCL2, pxL2, RL1, ppL1, FCL1, and pxL1 are sequentially formed on the MP trailing side. Optionally, RL2 may be merged into the MP trailing side so that a portion of the MP proximate to the MP/ppL2 interface serves to back scatter spin polarized electrons that flow from the TS to the MP (Ia is from the MP to TS). Here, back scattered spin polarized electrons from RL2 or the MP apply spin torque to FCL2 to cause m2 to flip to an opposite direction, and back scattered spin polarized electrons from RL1 apply spin torque to FCL1 that results in flipping of m1 to a substantially opposite direction. The second embodiment has the same benefit described previously of enhancing the write field at a lower Ia current density than required when only one FCL is present in the STRAMR device.

In all embodiments, RL1 and RL2 (when present) are comprised of a magnetic material with a sufficient magnetization saturation×thickness (Mst) value so that spin polarized electrons passing through RL1 and RL2 from the MP or TS have a small effect on changing the magnetization direction in the reference layers. FCL1 and FCL2 preferably have a Mst smaller than that of RL1 and RL2, and have a low damping constant α that is preferably <0.02 so that m1 and m2 are flipped with a bias current that is substantially less than $10 \times 10^8$ Amps/cm$^2$. Consequently, there is reduced risk of electromigration within the STRAMR layers, and acceptable device reliability is realized.

The present disclosure also encompasses a process flow for forming a STRAMR device between a MP and TS according to an embodiment described herein.

DETAILED DESCRIPTION

Figure 1:
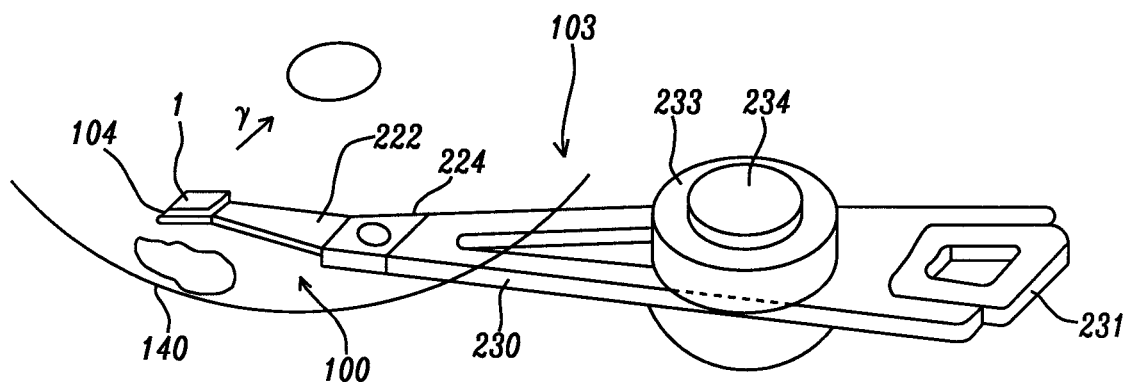
FIG. 1 is a perspective view of a head arm assembly of the present disclosure.

The present disclosure is a perpendicular magnetic recording (PMR) writer wherein a STRAMR device that enables both of a spin-torque-induced effect for FCL flipping, and a MAMR effect on adjacent magnetic bits in a magnetic medium, is formed between a MP and a TS, and a process for making the same. In the drawings, the y-axis is in a cross-track direction, the z-axis is in a down-track direction, and the x-axis is in a direction orthogonal to the ABS and towards a back end of the writer structure. Thickness refers to a down-track distance, width is a cross-track distance, and height is a distance from the ABS in the x-axis direction. In some of the drawings, a magnetic bit is considerably enlarged over actual size in order to more easily depict a magnetization therein. The terms "magnetic moment" and "magnetization" may be used interchangeably. The term "higher degree of flipping" means that FCL magnetization is flipped closer to a direction that is antiparallel to the WG magnetic field that is present at the FCL location and perpendicular to the plane of the FCL and with a smaller β cone angle in a precessional state.

Referring to FIG. 1, a head gimbal assembly (HGA) 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
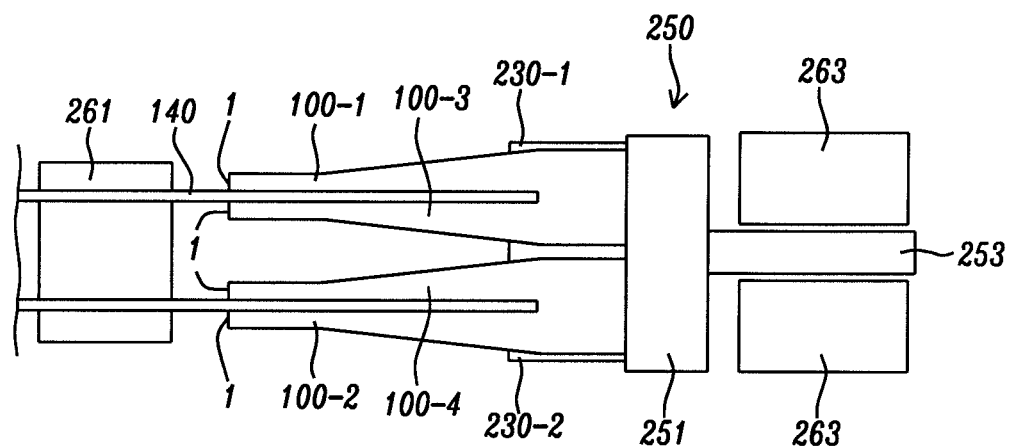
FIG. 2 is side view of a head stack assembly of the present disclosure.

Next, a side view of a head stack assembly (FIG. 2) and a plan view of a magnetic recording apparatus (FIG. 3) wherein the magnetic recording head 1 is incorporated are depicted. The head stack assembly 250 is a member to which a plurality of HGAs (HGA 100-1 and HGA 100-2 are at outer positions while HGA 100-3 and HGA 100-4 are at inner positions in the illustration) is mounted to arms 230-1, 230-2, respectively, on carriage 251. One or two HGAs are mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
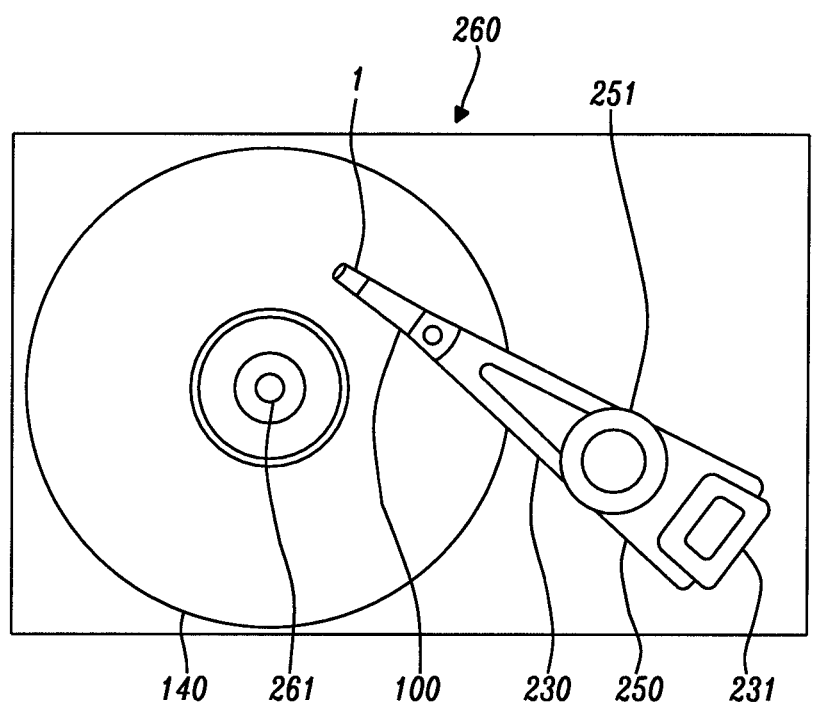
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to a spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track direction of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
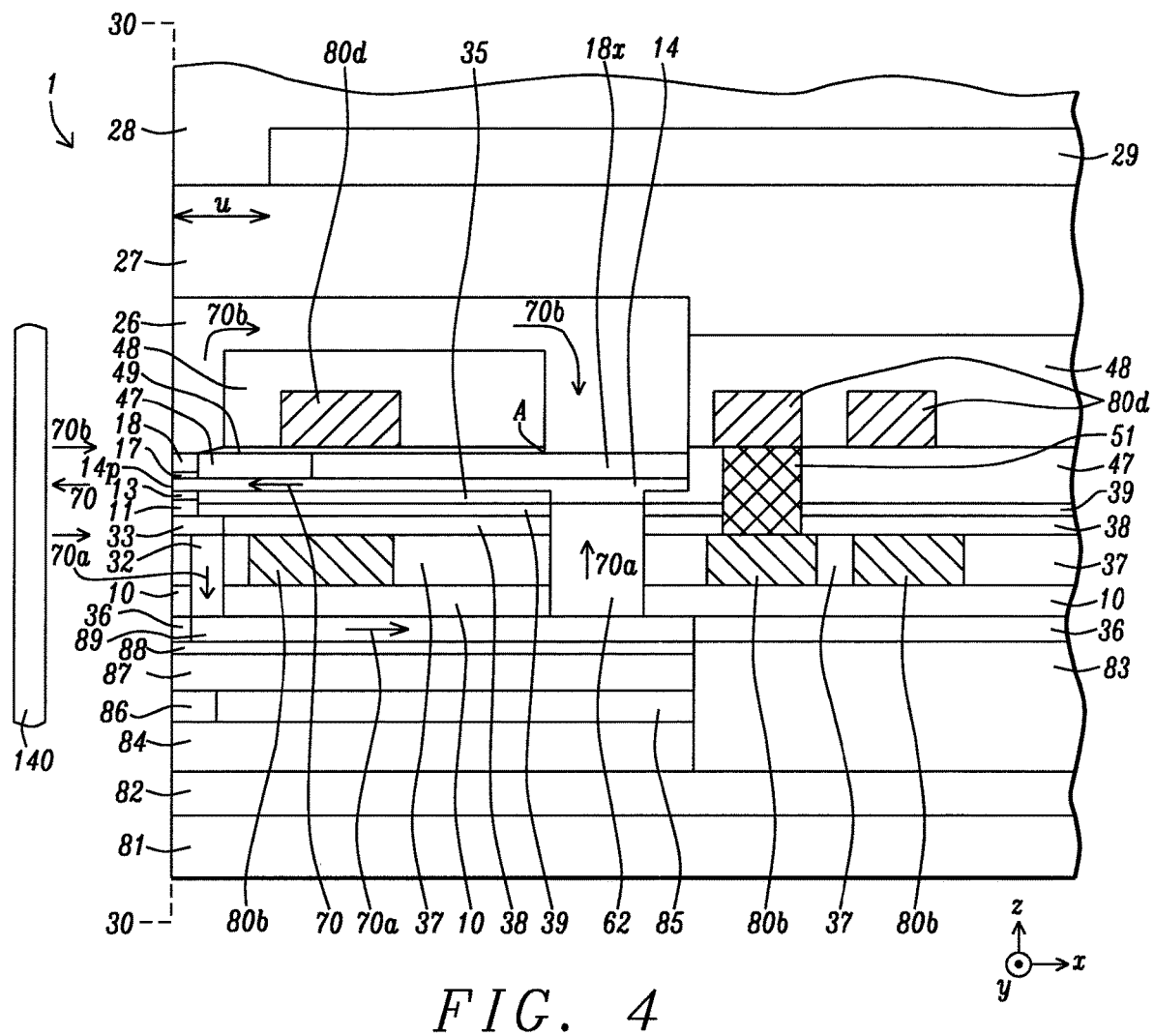
FIG. 4 is a down-track cross-sectional view of a combined read-write head with leading and trailing loop pathways for magnetic flux return to the main pole according to an embodiment of the present disclosure.

Referring to FIG. 4, a magnetic recording head 1 comprises a combined read-write device. The down-track cross-sectional view is taken along a center plane (44-44 in FIG. 16A) formed orthogonal to the ABS 30-30, and that bisects the main pole layer 14. The read head is formed on a substrate 81 that may be comprised of AlTiC (alumina+TiC) with an overlying insulation layer 82 that is made of a dielectric material such as alumina. The substrate is typically part of a slider formed in an array of sliders on a wafer. After the combined read head/write head is fabricated, the wafer is sliced to form rows of sliders. Each row is typically lapped to afford an ABS for each slider before dicing to fabricate individual sliders that are used in a magnetic recording device. A bottom shield 84 is formed on insulation layer 82.

A magnetoresistive (MR) element also known as MR sensor 86 is formed on bottom shield 84 at the ABS 30-30 and typically includes a plurality of layers (not shown) including a tunnel barrier formed between a pinned layer and a free layer where the free layer has a magnetization (not shown) that rotates in the presence of an applied magnetic field to a position that is parallel or antiparallel to the pinned layer magnetization. Insulation layer 85 adjoins the backside of the MR sensor, and insulation layer 83 contacts the backsides of the bottom shield and top shield 87. The top shield is formed on the MR sensor. An insulation layer 88 and a top shield (S2B) layer 89 are sequentially formed on the top magnetic shield. Note that the S2B layer 89 may serve as a flux return path (RTP) in the write head portion of the combined read/write head. Thus, the portion of the combined read/write head structure formed below layer 89 in FIG. 4 is typically considered as the read head. In other embodiments (not shown), the read head may have a dual reader design with two MR sensors, or a multiple reader design with multiple MR sensors.

The present disclosure anticipates that various configurations of a write head may be employed with the read head portion. In the exemplary embodiment, magnetic flux 70 in main pole (MP) layer 14 is generated with flowing a current through bucking coil 80b and driving coil 80d that are below and above the main pole layer, respectively, and are connected by interconnect 51. Magnetic flux 70 exits the main pole layer at pole tip 14p at the ABS 30-30 and is used to write a plurality of bits on magnetic media 140. Magnetic flux 70b returns to the main pole through a trailing loop comprised of trailing shields 17, 18, an uppermost (PP3) trailing shield 26, and top yoke 18x. There is also a leading return loop for magnetic flux 70a that includes leading shield (LS) 11, leading shield connector (LSC) 33, S2 connector (S2C) 32, return path 89, and back gap connection (BGC) 62. In another embodiment (not shown), only the LS is retained in the leading return loop in a so-called non-dual write shield (nDWS) scheme where the LSC, S2C, return path, and BGC are omitted to enhance magnetic flux in the trailing loop. The magnetic core may also comprise a bottom yoke 35 below the main pole layer. Dielectric layers 10, 13, 36-39, and 47-49 are employed as insulation layers around magnetic and electrical components. A protection layer 27 covers the PP3 trailing shield and is made of an insulating material such as alumina. Above the protection layer and recessed a certain distance u from the ABS 30-30 is an optional cover layer 29 that is preferably comprised of a low coefficient of thermal expansion (CTE) material such as SiC. Overcoat layer 28 is formed as the uppermost layer in the write head.

Previously, in related U.S. Pat. No. 10,325,618, we disclosed a STRAMR device between the MP and TS, and wherein a single FCL has a magnetization that flips to an opposite direction to the WG magnetic field at the FCL position when a current (Ia) of sufficient current density is applied from the TS to MR In related U.S. Pat. No. 10,490,216, a spin polarization (SP) layer is formed on both sides of a FCL so that Ia may be applied from the MP to TS, or in the reverse direction. However, in both of the aforementioned STRAMR examples, Ia current density required for magnetization flipping is typically sufficiently large so that there is a significant risk to electromigration and a reduction in device reliability. More recently, in related patent application Ser. No. 16/546,387, we described a STRAMR configuration where Ia is applied from the MP across a first SP layer to the FCL, and a second current (Ib) is applied from the TS across a second SP layer to the FCL. The combined spin torque generated by both SP layers substantially reduces the current density necessary to flip the FCL magnetization and thereby improves reliability. Now we have discovered an improved STRAMR configuration that provides spin flipping of two FCLs with a single current across the device, and effectively reduces Ia current density required for the same total FCL magnetization reversal compared with prior art STRAMR devices having only a single FCL in the WG.

Figure 5A:
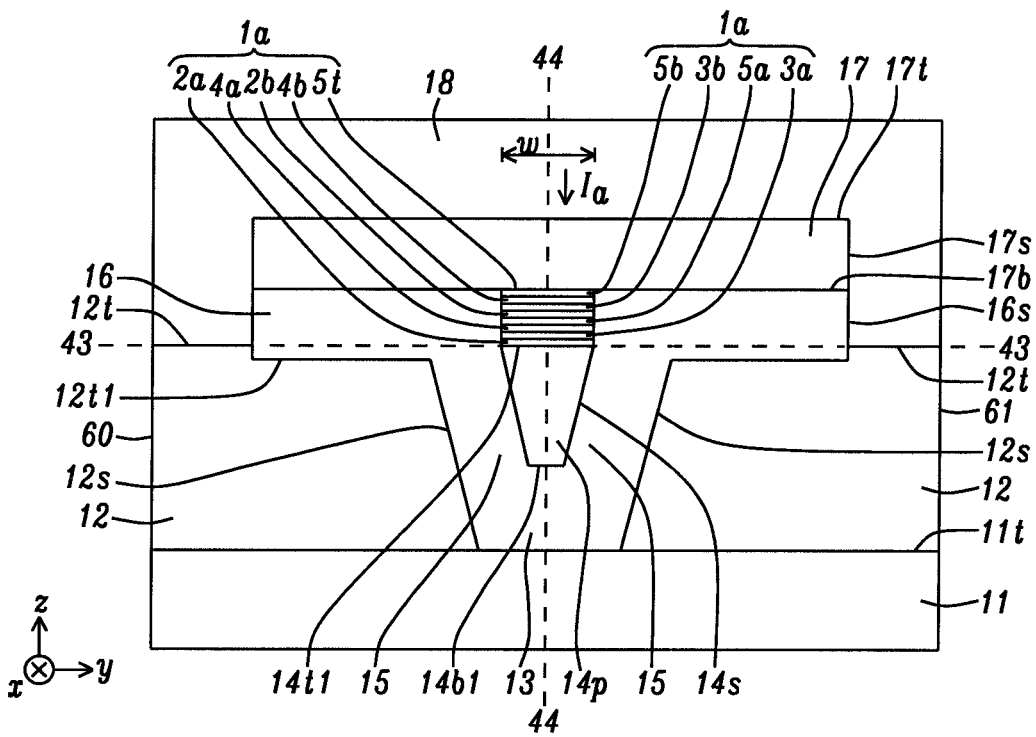
FIG. 5A is an ABS view and FIG. 5B is a down-track cross-sectional view of a STRAMR device within a write gap according to a first embodiment of the present disclosure where magnetizations in two FCLs flip to a substantially opposite direction when Ia is applied from the TS to MP and across the STRAMR device.

Referring to FIG. 5A, a first embodiment of the present disclosure is depicted. In the exemplary embodiment, the main pole has a MP tip 14p that is surrounded with an all wrap around (AWA) shield structure. MP trailing side 14t1 at the ABS is at plane 43-43 that also comprises side shield (SS) top surface outer portion 12t proximate to SS sides 60 and 61 on opposite sides of center plane 44-44 that bisects the MP trailing side and MP leading side 14b1. Each SS 12 has a top surface inner portion 12t1 that is below plane 43-43. However, in other embodiments (not shown), both of the SS top surface inner portions and outer portions may be at plane 43-43. Leading shield 11 has a top surface 11t that contacts a bottom surface of each SS, and is separated from the MP leading side by leading gap 13. Each MP tip side 14s is separated from a side shield by side gap 15. Write shield 18 contacts SS top surface 12t on each side of the center plane, and also adjoins sides 16s of WG 16, and the top surface 17t and sides 17s of trailing shield (TS) 17. The TS is comprised of a magnetic material such as FeNi, FeCo, FeCoNi, or FeCoN having a saturation magnetization (Ms) value from 19 kilo Gauss (kG) to 24 kG and is formed on the WG.

A key feature is that a STRAMR device 1a having a width w that is proximate or equal to the width of MP trailing side 14t1 is formed between the MP trailing side and TS 17, and within WG 16. According to a first embodiment, the STRAMR device has a stack of layers where a first non-spin polarization preserving layer (pxL1) 2a, first FCL (FCL1) 3a, first spin polarization preserving layer (ppL1) 4a, first reference layer (RL1) 5a, second non-spin polarization preserving layer (pxL2) 2b, second FCL (FCL2) 3b, second spin polarization preserving layer (ppL2) 4b, and an optional second reference layer (RL2) 5b with top surface 5t are sequentially formed on the MP trailing side. Uppermost layer RL2 (or ppL2 when RL2 is omitted) contacts TS bottom surface 17b. As shown in FIG. 5D, FCL1 3a, and FCL2 3b have magnetizations 3m1 and 3m2, respectively, that flip to a substantially opposite direction (opposing $H_{WG}$) when current Ia is applied from TS 17 to MP tip 14p and across the STRAMR device.

Preferably, each of pxL1 2a and pxL2 2b is an alloy or multilayer made of one or more materials including but not limited to Cr, Ir, NiCr, Ta, W, Pt, Pd, Rh, Ti that have a substantial spin flipping scattering rate meaning that spin polarization orientation is randomized and that net spin polarization in electrons transiting pxL1 and pxL2 is effectively lost. Here pxL1 may also serve as a seed layer to promote uniform thickness in overlying STRAMR layers, and prevent rounding on the MP during fabrication as explained later. Meanwhile, ppL1 4a and ppL2 4b are comprised of one or more non-magnetic materials such as Cu, Au, Ag, Ru, and Al having sufficient spin diffusion length to allow electron spin (polarization) in essentially an unaltered orientation for electrons traversing through ppL1 and ppL2. In some embodiments, one or both of pxL1 and pxL2 may contain a pxL material and a ppL material in a bilayer stack.

FCL1 3a and FCL2 3b as well as RL1 5a and RL2 5b are magnetic layers made of one or more of Fe, Ni, and Co, or alloys thereof with one or more of B, Mo, Cr, Pt, Pd, and W, for example. Note that RL1 and RL2 (when present) have a sufficiently large Mst (Ms×thickness) value such that their magnetizations 5m1 and 5m2 (see FIG. 5B), respectively, are essentially unaffected by spin polarized electrons passing through the reference layers. It is important that FCL1 and FCL2 have a sufficiently small Mst value (less than that of RL1) and a damping constant preferably less than 0.02 to allow their magnetizations 3m1 and 3m2 (FIG. 5B), respectively, to flip to a direction substantially opposite to $H_{WG}$ as a result of spin torque generated by reflected (back scattered) spin polarized electrons from RL1 and RL2 (or TS 17), respectively, as explained later with regard to FIG. 5D.

Figure 5B:
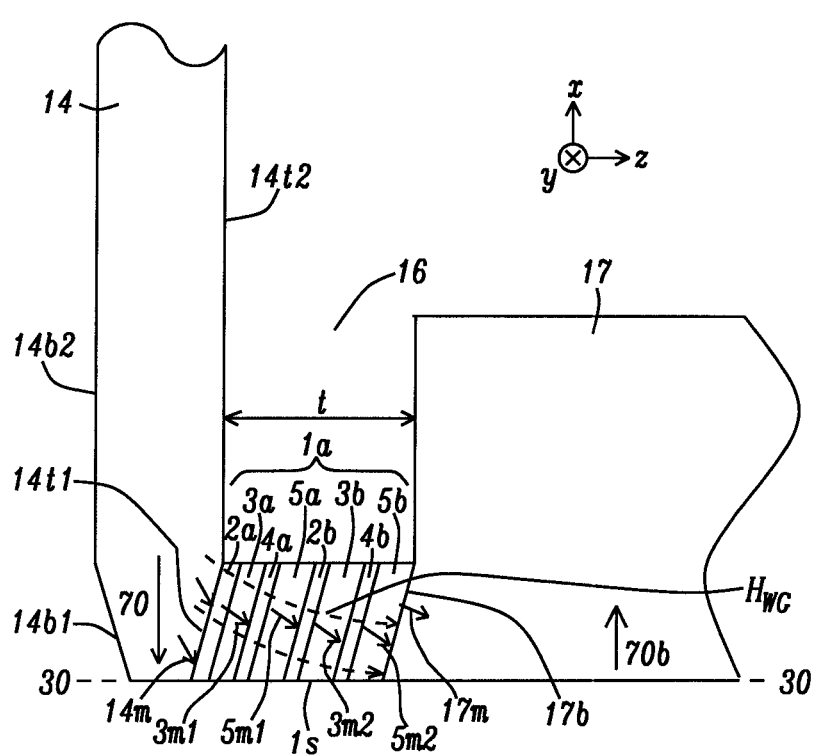

As shown in FIG. 5B, MP 14 generates a large local magnetic field in order to write a transition in the area directly under the MP and in previously written media bit 9 with magnetization 9m on medium 140. In the past, the MP magnetic field is sufficient to write the transition when the areal density requirement is lower. When the areal density requirement is higher for advanced PMR writers, the MP magnetic field is not sufficient to write a transition without an assisted writing technique such as STRAMR. Magnetic flux 70 in the MP proceeds through the ABS 30-30 and into medium bit layer 142 and soft underlayer (SUL) 141. A portion of magnetic flux is collected by trailing shield 17 in the form of return field 70b and then returns to the MP through a trailing loop (shown in FIG. 4). A front side 1s of STRAMR device 1a is at the ABS, and bottommost layer pxL1 (not shown) is formed on the MP tapered trailing side 14t1, which connects with a MP top surface 14t2 that is aligned orthogonal to the ABS. The MP leading side 14b1 is also tapered and connects with the MP bottom surface 14b2. In other embodiments (not shown), one or both of the MP trailing and leading sides may be orthogonal to the ABS. WG (magnetic) field $H_{WG}$ is shown across the STRAMR device in a direction from the MP trailing side to TS bottom surface 17b. WG thickness t may be 10 nm or less in advanced PMR writers, but is typically about 25 nm or larger in current writer designs. FCL1 and FCL2 magnetizations 3m1 and 3m2, respectively, as well as RL1 and RL2 magnetizations 5m1 and 5m2, respectively, are substantially in the $H_{WG}$ direction in the absence of an applied Ia.

In preferred embodiments where STRAMR device thickness t is proximate to 25 nm or less in order to fit in a WG 16 of similar thickness, a thickness of each of FCL1 3a, FCL2 3b, RL1 5a, and RL2 5b is from 1 nm to 4 nm. Meanwhile, each of pxL1 2a, pxL2 2b, ppL1 4a, and ppL2 4b has a thickness from 1 nm to 4 nm.

Figure 5C:
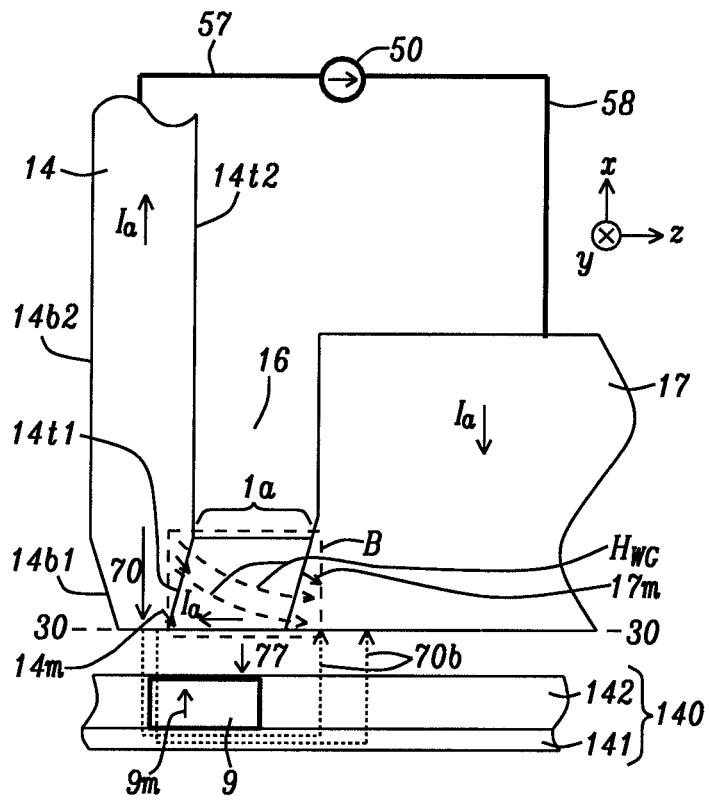
FIG. 5C is another view of the STRAMR device in FIG. 5B where Ia is applied from the TS to the MP when the write field is down (out of the ABS) toward a magnetic medium, and where a RF field may simultaneously be generated with a STRAMR assist that boosts the write field.
Figure 5D:
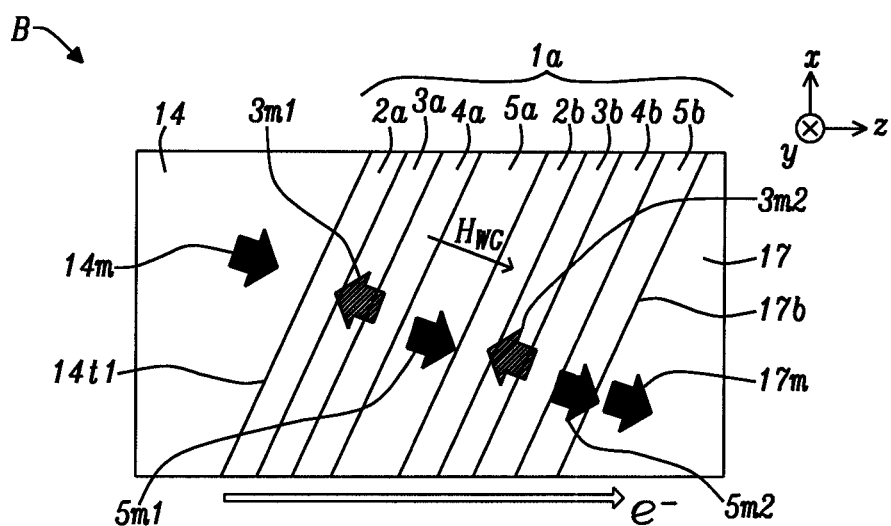
FIG. 5D is an enlargement of a portion of FIG. 5C within box B that shows the magnetizations in two FCLs are flipped and point towards the MP trailing side thereby increasing reluctance in the write gap.
Figure 9:
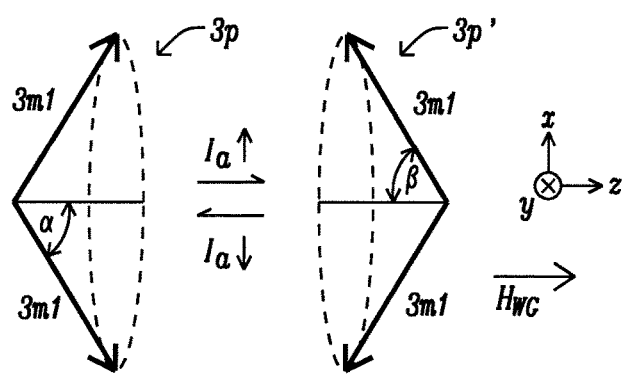
FIG. 9 illustrates a cone angle α of FCL magnetization in a precessional state that flips to a precessional state with cone angle β when an Ia of sufficient current density is applied across the STRAMR device according to an embodiment of the present disclosure.

Referring to FIG. 5C, the microwave assisted magnetic recording (MAMR) aspect that generates RF field 77 on a recording medium occurs when FCL1 magnetization 3m1 (and FCL2 magnetization 3m2) enter a precessional state 3p with cone angle α<180° at a first current density for Ia shown in FIG. 9. When Ia is below a critical value, magnetization 3m1 remains substantially in the $H_{WS}$ direction and there is no STRAMR effect. However, when Ia exceeds a critical value between $1 \times 10^6$ Amps/cm² to $1 \times 10^8$ Amps/cm², magnetization 3m1 (and 3m2 not shown) flip to a precessional state 3p' having cone angle β that is substantially opposed to the $H_{WS}$ direction thereby increasing reluctance in WG 16 and enhancing the write field. As Ia current density increases further, angle θ decreases until approaching 0 degrees where there is a maximum STRAMR effect but essentially no MAMR effect. Note that direct current (DC) Ia from source 50 in FIG. 5C is applied through lead 58 to TS 17 and then flows across STRAMR device 1a to MP 14 before returning through lead 57 to the DC source. Thus, only a MAMR effect occurs in precessional state 3p while both of a STRAMR effect and MAMR effects are possible in precessional state 3p'.

Referring to FIG. 5D, the STRAMR device within dashed rectangular region B in FIG. 5C is enlarged. FCL1 magnetization 3m1 and FCL2 magnetization 3m2 are shown after entering precessional state 3p' (FIG. 9) and flipping to a direction that is substantially toward MP trailing side 14t1 and opposing $H_{WG}$. RL1 magnetization 5m1 and RL2 magnetization 5m2 remain generally in the direction of $H_{WS}$ and substantially parallel to local MP magnetization 14m and to local TS magnetization 17m. It should be understood that the flow of electrons is from the MP 14 to TS 17 when the Ia direction is from the TS to MP. Ia is spin polarized in each of the magnetic layers, and reflected spin polarized electrons from RL2 produce a spin torque on FCL2 3b that causes FCL2 magnetization 3m2 to flip. Similarly, Ia is spin polarized in FCL1 and in RL1 5a, such that spin polarized electrons reflected from RL1 produce a spin torque on FCL1 3a to cause FCL1 magnetization 3m1 to flip. As a result, Ia current density required to provide a certain enhancement in the write field may be about 50% less than when only one FCL (with Mst equal to the sum of FCL1 and FCL2) is present in a STRAMR device of the prior art.

The mechanism of FCL1 magnetization 3m1 and FCL2 magnetization 3m2 flipping is based on the behavior of electrons with spins parallel and anti-parallel to the magnetization 5m1 in RL1 and to magnetization 5m2 in RL2 5b (or to magnetization 17m in TS 17), respectively. The portion of electrons in Ia having a moment that is parallel to RL1 magnetization is able to enter RL1 with very little resistance. However, electrons with a moment that is anti-parallel to RL1 magnetization 5m1 do not enter RL1 easily because of less unoccupied states in RL1, and are scattered back to FCL1 3a. The back scattered electrons (not shown) exert spin torque on magnetization 3m1 that results in flipping. Similarly, the portion of electrons in Ia having a moment that is parallel to RL2 magnetization 5m2 (or TS magnetization 17m) are able to enter RL2 (or the TS when RL2 is absent) with very little resistance. On the other hand, electrons with a moment that is anti-parallel to RL2 (or TS) magnetization do not enter RL2 or the TS easily because of less unoccupied states in RL2 or the TS, and are scattered back (not shown) to FCL2 3b. As a result, a spin torque is exerted on FCL2 magnetization. Accordingly, FCL2 magnetization 3m2 is flipped and is primarily oriented toward the MP trailing surface 14t1 and parallel to flipped FCL1 magnetization 3m1.

Figure 6:
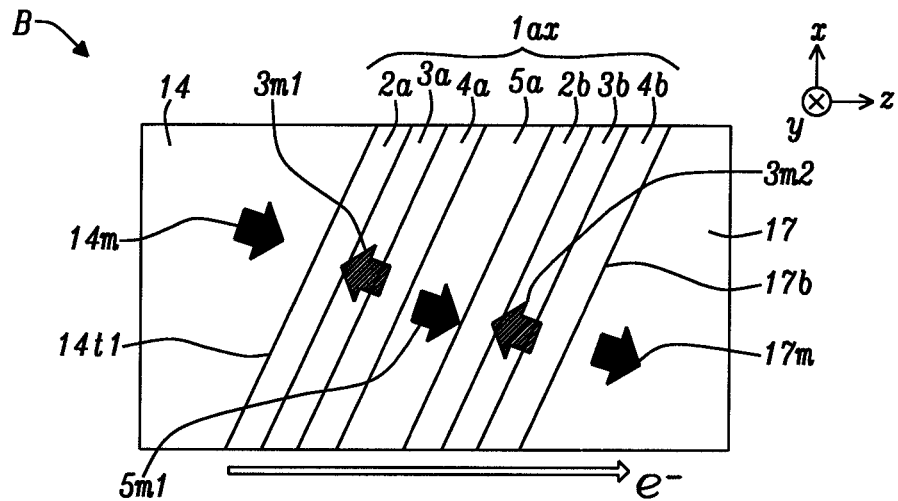
FIG. 6 shows an alternative embodiment of the present disclosure where the optional RL2 layer in FIG. 5D is omitted in order to decrease the thickness of the STRAMR device.

In an alternative embodiment depicted in FIG. 6 where sacrificial RL2 5b is omitted and ppL2 4b is the uppermost layer in the STRAMR device 1ax, then the portion of TS 17 proximate to TS bottom surface 17b is responsible for back scattering spin polarized electrons (e⁻) in Ia that exert a spin torque on FCL2 magnetization 3m2 and cause the FCL2 magnetization to flip to a direction substantially opposite to $H_{WS}$.

Figure 7A:
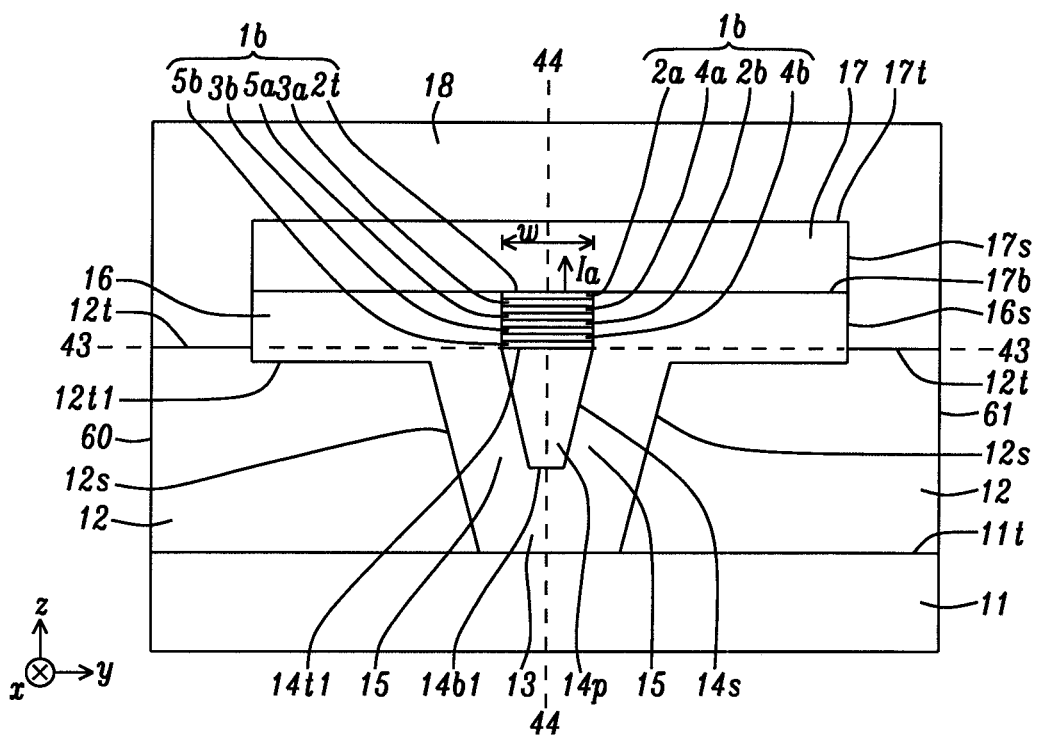
FIG. 7A is an ABS view and FIG. 7B is a down-track cross-sectional view of a STRAMR device within a WG according to a second embodiment of the present disclosure where magnetizations in two FCLs flip to a substantially opposite direction when Ia is applied from the MP to TS and across the STRAMR device.

According to a second embodiment shown in FIG. 7A, the STRAMR device layers in FIG. 5A are retained except the positions of the layers are reversed so that optional RL2 5b, ppL2 4b, FCL2 3b, pxL2 2b, RL1 5a, ppL1 4a, FCL1 3a, and pxL1 2a with top surface 2t in STRAMR device 1b are sequentially formed on the MP tapered trailing side 14t1. In this case, current Ia is applied from the MP tip 14p to TS 17 in order to cause FCL1 and FCL2 magnetization flipping within the STRAMR device that increases reluctance in WG 16 and enhances the write field.

Figure 7B:
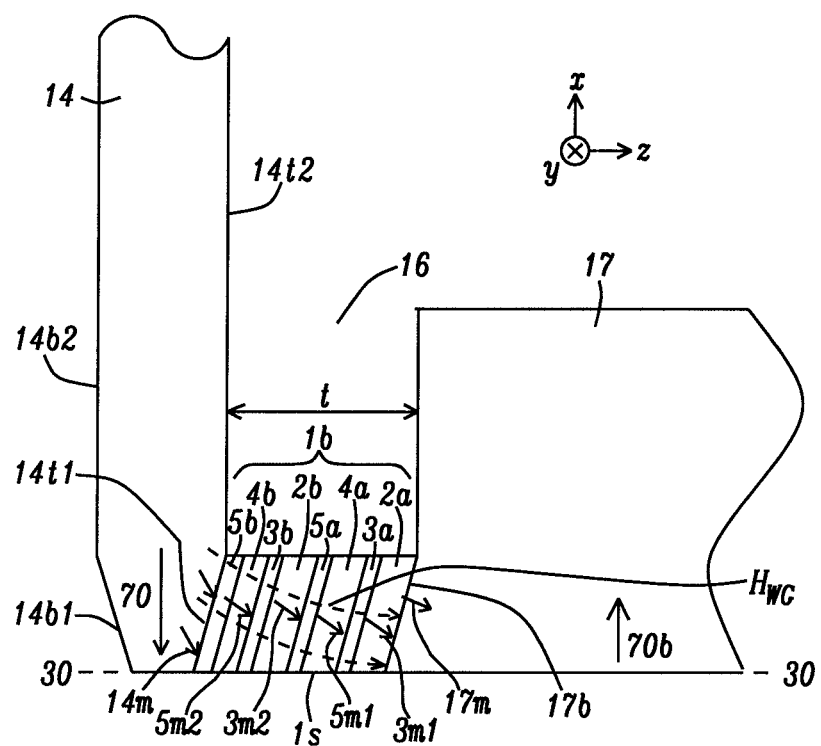

Referring to FIG. 7B, when the magnetic flux 70 is pointing down out of the ABS 30-30 to write a transition at the boundary of magnetic bit 9 in magnetic medium 140 (FIG. 7C), return field 70b is pointing up and into TS 17. Again, there is local magnetization 14m within MP 14 and proximate to MP trailing side 14t1, and there is local magnetization 17m proximate to TS bottom surface that are both aligned substantially parallel to $H_{WG}$ that is in a direction from the MP to TS. In the absence of an applied current, FCL1 magnetization 3m1, FCL2 magnetization 3m2, RL1 magnetization 5m1, and RL2 magnetization 5m2 are also substantially parallel to $H_{WS}$. In the exemplary embodiment, front side 1s of the STRAMR device 1b is at the ABS. However, in other embodiments, the front side may be recessed from the ABS to reduce the risk of wear during repeated touchdowns.

Figure 7C:
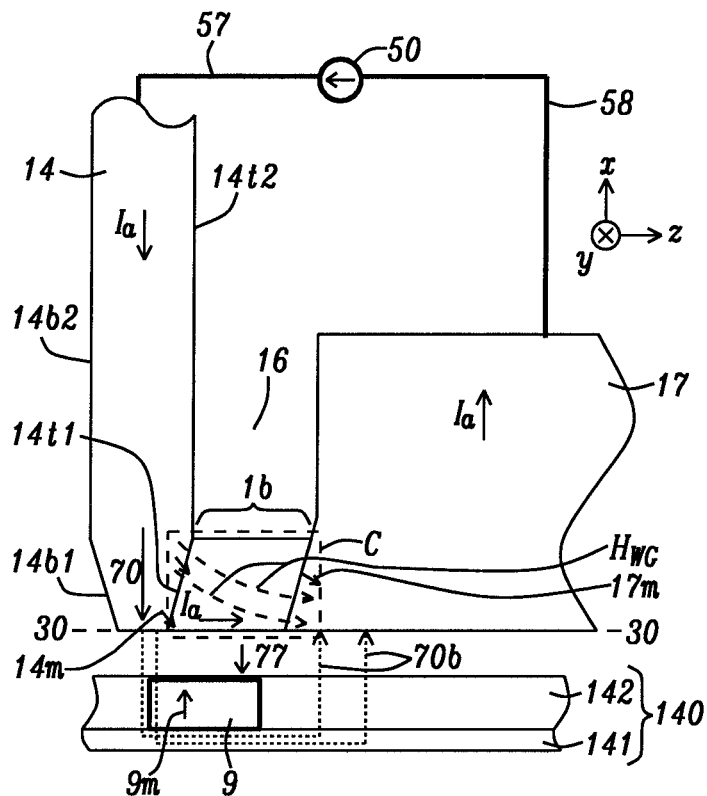
FIG. 7C is another view of the STRAMR device in FIG. 7B where Ia is applied from the MP to the TS when the write field is down (out of the ABS) toward a magnetic medium, and where a RF field may simultaneously be generated with a STRAMR assist that boosts the write field.
Figure 7D:
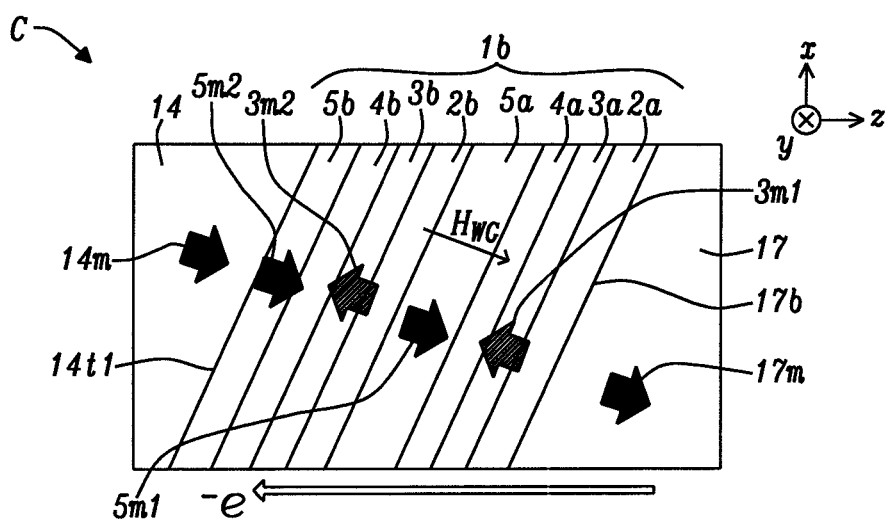
FIG. 7D is an enlargement of a portion of FIG. 7C within box C that shows the magnetizations in two FCLs are flipped and point toward the MP trailing side (opposing the WG field) thereby increasing reluctance in the write gap.

In FIG. 7C, current Ia is applied from MP 14 and across STRAMR device 1b to TS 17 to generate one or both of a MAMR effect (RF field 77), and a STRAMR effect where FCL1 and FCL2 magnetizations 3m1 and 3m2, respectively, and shown in FIG. 7D are flipped to a direction substantially opposite to $H_{WS}$. As mentioned previously in the first embodiment, when Ia current density is below a critical value, each FCL magnetization is in a dynamic (precessional) state 3p with cone angle α<180° (see FIG. 9). When Ia current density exceeds a critical value between $1 \times 10^6$ Amps/cm² to $1 \times 10^8$ Amps/cm², FCL1 magnetization 3m1 (and FCL2 magnetization 3m2) flip to a precessional state 3p' having cone angle β that is substantially opposed to the $H_{WS}$ direction thereby increasing reluctance in WG 16 and enhancing write field 70. Cone angle β decreases with increasing Ia current density until approaching 0 degrees where there is a maximum STRAMR effect. An advantage of all embodiments described herein is that two FCL magnetizations for FLC1 and FCL2 that have $Mst_1$ and $Mst_2$, respectively, are flipped to the same degree (substantially equivalent β cone angles) as one FCL magnetization (with $Mst=Mst_1+Mst_2$) in the prior art thereby generating greater (additive) reluctance in the WG and a larger write field increase at the same current density. Alternatively, the write field is enhanced to the same extent with a lower Ia current density compared with a STRAMR device having a single FCL in the prior art. As a result, there is less risk of electromigration within the STRAMR layers and improved device reliability.

FIG. 7D is an enlargement of STRAMR device 1b within dashed rectangle C in FIG. 7C. Here, the electron flow is from right to left (TS to MP) so that RL2 5b back scatters spin polarized electrons that exert a spin torque on FCL2 3b and cause magnetization 3m2 to flip to a direction pointing substantially toward MP trailing side 14t1. Meanwhile, RL1 5a back scatters spin polarized electrons that produce a spin torque on FCL1 3a and cause magnetization 3m1 to flip to a direction substantially opposite to $H_{WG}$.

The mechanism for flipping FCL1 magnetization 3m1 was described earlier with respect to the first embodiment. In the second embodiment, flipping FCL2 magnetization 3m2 is explained as follows. The portion of electrons in current Ia having a moment that is parallel to RL2 magnetization 5m2 (or MP magnetization 14m) are able to enter RL2 5b (or MP 14 when RL2 is absent) with very little resistance. On the other hand, electrons with a moment that is anti-parallel to RL2 (or MP) magnetization do not enter RL2 (or the MP) easily because of less unoccupied states in RL2 or in the MP proximate to MP trailing side 14t1, and are scattered back (not shown) to FCL2 3b. As a result, a spin torque is exerted on FCL2 magnetization, and FCL2 magnetization is flipped and is primarily oriented toward the MP trailing surface 14t1 and opposed to $H_{WG}$.

Figure 8:
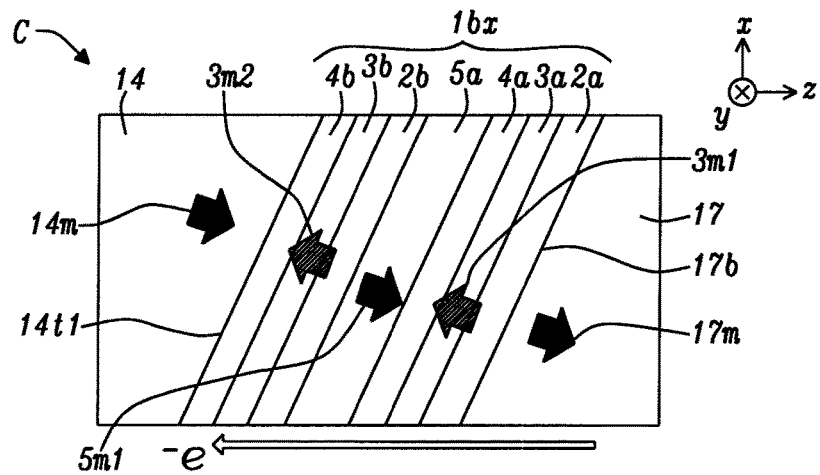
FIG. 8 shows an alternative embodiment of the present disclosure where the optional RL2 layer in FIG. 7D is omitted in order to decrease the thickness of the STRAMR device.

In an alternative embodiment depicted in FIG. 8 where sacrificial RL2 5b is omitted and ppL2 4b is the bottommost layer in STRAMR device 1bx, the portion of MP 14 proximate to MP trailing side 14t1 serves to back scatter the spin polarized electrons (e⁻) in Ia that exert a spin torque on FCL2 magnetization 3m2 and cause the FCL2 magnetization to flip to a direction substantially opposite to $H_{WG}$. As indicated earlier, RL1 back scatters spin polarized electrons that generate spin torque on FCL1 3a and cause magnetization 3m1 to flip to a direction substantially opposing $H_{WG}$.

In all embodiments, the advantage of greater enhancement to the write field at a given current density (compared with the prior art where there is only one FCL in a STRAMR device) is associated with an improved bit error rate (BER) and better area density capability (ADC) performance. Furthermore, in other embodiments where a lower Ia current density is required to generate the same increase in reluctance in the WG as a single FCL in the prior art, there will be reduced power consumption in addition to improved STRAMR device reliability since there is less electromigration in metal spacers and a reduced risk of other breakdown mechanisms.

Figure 10A:
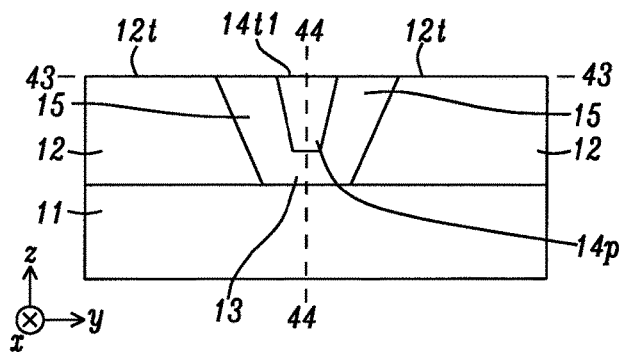
FIG. 10A and FIG. 10B show an ABS view and down-track cross-sectional view, respectively, of a first step in the process of forming a STRAMR device of the present disclosure where a tapered trailing side is formed on the main pole.
Figure 10B:
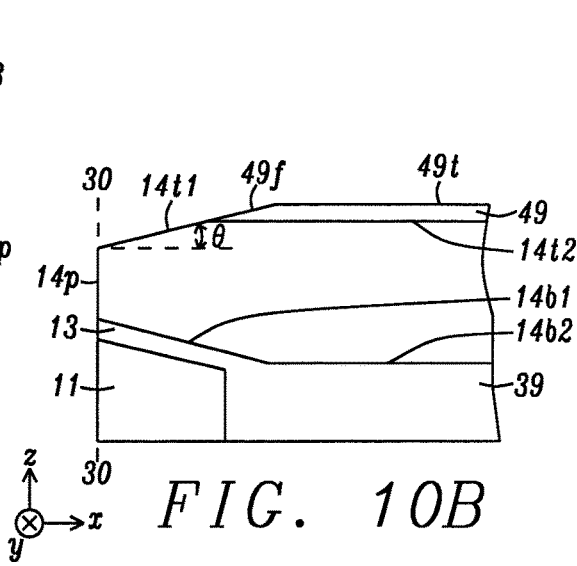

The present disclosure also encompasses a process sequence for fabricating a STRAMR device according to an embodiment described herein and is provided in FIG. 10A through FIG. 15. The partially formed writer structure including MP tip 14p that adjoins side gaps 15 and leading gap 13 in FIG. 10A is provided according to a conventional process sequence. Side shield top surfaces 12t are coplanar with a trailing edge of the MP tapered trailing side 14t1 at plane 43-43, which is orthogonal to the subsequently formed ABS plane. FIG. 10B shows the down-track cross-sectional view at plane 44-44 in FIG. 10A. MP tapered trailing side 14t1 has a taper angle θ and is coplanar with a tapered front side 49f of dielectric layer 49 made of $Al_2O_3$ or $SiO_2$ that is formed on MP top surface 14t2. Note that the eventual ABS, hereinafter referred to as ABS plane 30-30, is not determined until a lapping process is performed after sliders are formed in a back end of the fabrication scheme.

Figure 11:
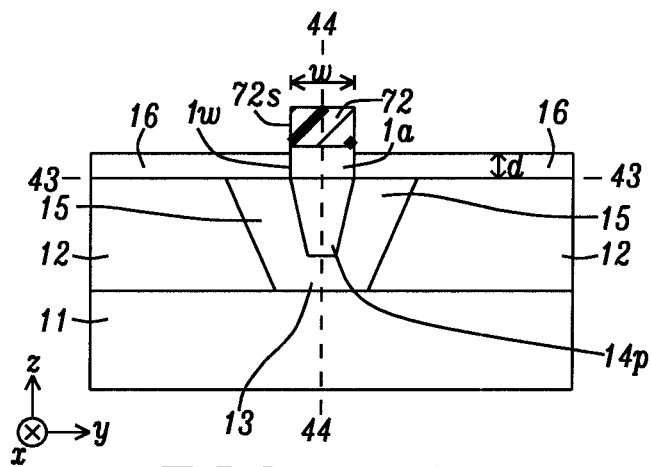
FIG. 11 shows an ABS view of the writer structure in FIG. 10A after a STRAMR stack of layers is deposited and is patterned to establish a cross-track width for the STRAMR device, and then a write gap layer is deposited on the side shields.

In FIG. 11, a STRAMR stack of layers described previously with regard to the first embodiment is deposited on the MP tapered trailing side 14t1 and on dielectric layer 49. The STRAMR stack of layers is preferably conformal to the underlying topography and has a uniform thickness. Next, a first photoresist layer is coated on the STRAMR stack of layers, and is patternwise exposed and developed to provide a photoresist mask 72 having sides 72s and a cross-track width w that is bisected by center plane 44-44. The photoresist mask pattern is etch transferred through the STRAMR stack of layers using a RIE or IBE process, for example, thereby forming STRAMR device 1a with sides 1w separated by width w. In some embodiments, the IBE/RIE process may simultaneously generate a backside on STRAMR device 1a. Thereafter, WG layer 16 with thickness d is deposited on the side shields 12 and side gaps 15. In some embodiments, thickness d may be different from STRAMR device thickness t shown in FIG. 5B. The process flow described herein also anticipates that STRAMR device 1ax, 1b, or 1bx may be substituted for STRAMR device 1a in the exemplary embodiment.

Figure 12:
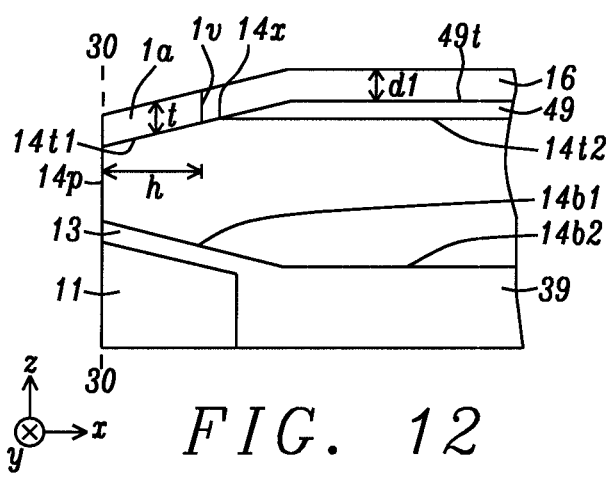
FIG. 12 is a down-track cross-sectional view of the writer structure in FIG. 11 after a second patterning step is used to form a backside on the STRAMR device and a WG layer is deposited behind the STRAMR device backside.

Referring to FIG. 12, a down-track cross-sectional view at plane 44-44 is depicted for the partially formed writer structure after photoresist mask 72 is removed by a conventional method. STRAMR device 1a has a front side Is at the ABS plane 30-30, a backside 1v at height h from the ABS plane, and a thickness t. In some embodiments, WG 16 behind the STRAMR device has thickness d1 that may be essentially equal to t. Typically, h is a lesser distance from the ABS plane than edge 14x (at height a) where the MP tapered trailing side 14t1 joins MP top surface 14t2.

Figure 13:
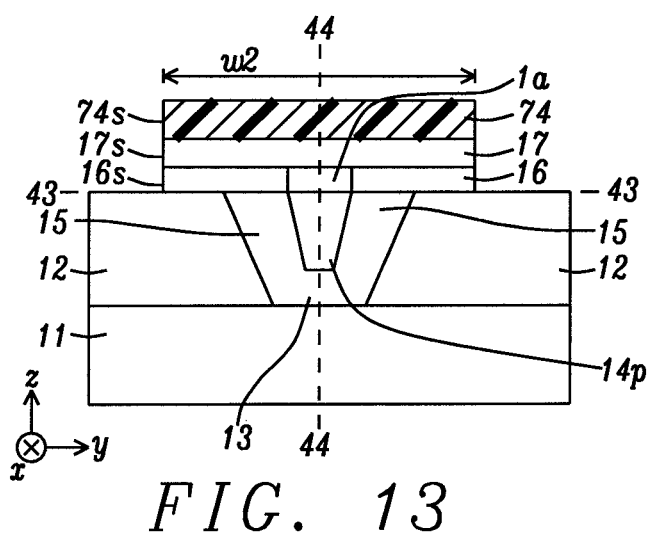
FIG. 13 is an ABS view of the writer in FIG. 12 after a TS layer is deposited on the STRAMR device and WG, and the WG and TS layers are patterned to form a TS cross-track width, and uncover portions of the side shield top surface.

Referring to FIG. 13, TS layer 17 is deposited on STRAMR device 1a and on WG 16, and on side shield top surface 12t. Thereafter, a second photoresist layer is coated on the TS layer and is patterned to form photoresist mask 74 having sides 74s and a width w2 where w2>w. A second RIE or an ion beam etch (IBE) is employed to transfer the photoresist mask pattern through exposed portions of the TS layer and WG, and stops on side shield top surface 12t at plane 43-43 thereby generating TS side 17s and WG side 16s on each side of plane 44-44.

Figure 14:
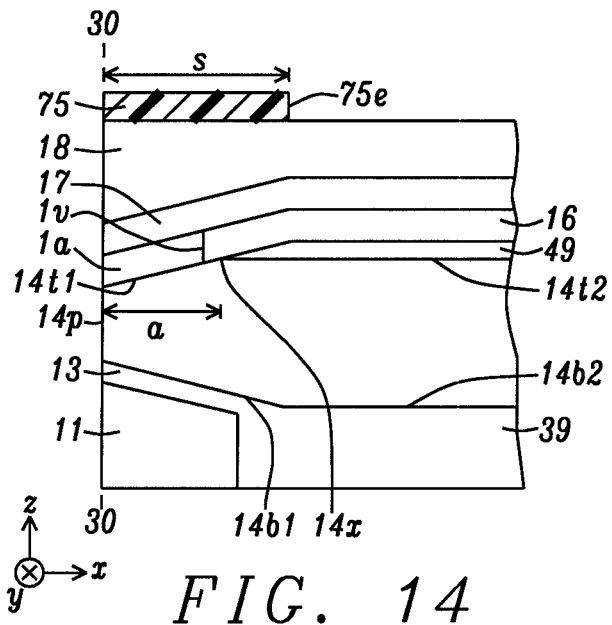
FIGS. 14-15 are down-track cross-sectional views after a write shield (WS) is deposited, and a patterning and etching process sequence is performed to establish a backside on each of the TS and the WS according to an embodiment described herein.

Referring to FIG. 14, photoresist mask 74 is removed. Then the write shield (WS) 18 is deposited on TS 17 and on side shields 12. A third photoresist layer is coated and patterned on the WS to provide photoresist mask 75 having a backside 75e at height s from the ABS plane 30-30 where s is generally larger than height h of MP edge 14x described earlier.

Figure 15:
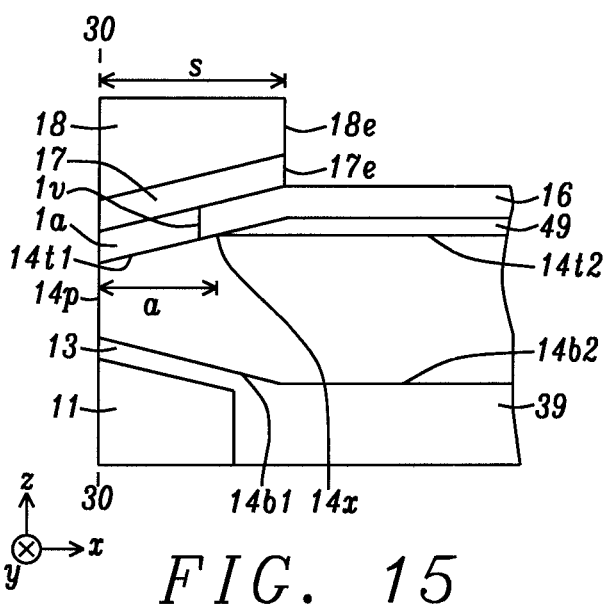

FIG. 15 depicts the partially formed writer structure in FIG. 14 after a third RIE or IBE step is performed to transfer the photoresist mask pattern through exposed regions of TS 17 and WS 18, and stops at WG top surface 16t thereby forming TS backside 17e and WS backside 18e at height s from the ABS plane 30-30. Thereafter, a conventional process flow is followed to complete the writer structure. According to one embodiment, a combined read-write head 1 shown in FIG. 4 is formed at the completion of the fabrication process. It should be understood that backend processes such as lapping that define the ABS typically involve lapping and ion beam etching. Both tend to smooth out sharp corners such as where the STRAMR device adjoins the MP tip and TS bottom surface. Accordingly, a pxL material that is Ta or W, for example, that has a hardness generally greater than other metals, is preferred at the interface with the MP tip or TS to maintain sharp corners and enhance the write field.

While the present disclosure has been particularly shown and described with reference to, the preferred embodiments thereof, it will be understood by those skilled in the art that various changes in form and details may be made without departing from the spirit and scope of this disclosure.

We claim:

1. A perpendicular magnetic recording (PMR) writer having a spin transfer torque reversal assisted magnetic recording (STRAMR) structure, comprising:

(a) a main pole (MP) that is configured to generate a magnetic (write) field which is directed through a MP pole tip at an air bearing surface (ABS), and to generate a field in the write gap (WG) along a down-track direction between a MP trailing side and a trailing shield, and across the WG and a STRAMR device;

(b) the trailing shield (TS) with a side at the ABS, and a bottom surface facing the MP trailing side; and (c) the STRAMR device having a top surface contacting the TS bottom surface, and a bottom surface adjoining the MP trailing side, comprising:

(1) a first non-spin polarization preserving layer (pxL1) on the MP trailing side, and that effectively randomizes the spin polarization of electrons flowing through pxL1;

(2) a first flux change layer (FCL1) with a first magnetization substantially parallel to the field in the WG when no current is present and having a bottom surface contacting pxL1, and a top surface;

(3) a first spin preserving layer (ppL1) that adjoins the FCL1 top surface, and that effectively retains a spin polarization of the electrons transiting ppL1;

(4) a first reference layer (RL1) formed on ppL1 and having a second magnetization that is substantially parallel to the magnetic field in the WG;

(5) a second non-spin polarization preserving layer (pxL2) on RL1 that effectively randomizes a spin polarization of electrons flowing through pxL2;

(6) a second flux change layer (FCL2) formed on pxL2 and having a third magnetization substantially parallel to the field in the WG in the absence of direct current (DC); and (7) a second spin polarization preserving layer (ppL2) adjoining a FCL2 top surface, and that effectively retains a spin polarization of the electrons transiting ppL2, and wherein the STRAMR device is configured so that when a DC of sufficient magnitude is applied from the TS to MP across the STRAMR device, the first and third magnetizations flip to a direction substantially opposing the field in the WG thereby increasing reluctance in the WG and enhancing the write field, and wherein the second magnetization, and a fourth magnetization in an adjacent magnetic layer in the form of a portion of the TS or a second reference layer (RL2) remain substantially parallel to the WG field.

2. The PMR writer of claim 1 wherein a top surface of ppL2 contacts the TS bottom surface, and a portion of the TS proximate to the TS bottom surface is the adjacent magnetic layer.

3. The PMR writer of claim 1 wherein the STRAMR device is further comprised of the RL2 adjoining a top surface of ppL2, and contacting the TS bottom surface, and wherein RL2 is the adjacent magnetic layer.

4. The PMR writer of claim 1 wherein ppL1 and ppL2 are one or more of Cu, Au, Ag, Ru, and Al.

5. The PMR writer of claim 1 wherein each of pxL1 and pxL2 is an alloy or a multilayer of one or more of Cr, Ir, NiCr, Ta, W, Pt, Pd, Rh, Ti.

6. The PMR writer of claim 1 wherein each of FCL1, FCL2, and RL1 is comprised of one or more of Fe, Ni, and Co, or alloys thereof with one or more of B, Mo, Cr, Pt, Pd, and W, and wherein RL1 has a magnetization saturation× thickness (Mst) value substantially larger than that of FCL1.

7. The PMR writer of claim 1 wherein each of ppL1, ppL2, pxL1, and pxL2 has a thickness from 1 nm to 4 nm.

8. The PMR writer of claim 1 wherein each of RL1, FCL1, and FCL2 has a thickness from 1 nm to 4 nm.

9. A head gimbal assembly (HGA), comprising:

(a) the PMR writer of claim 1; and (b) a suspension that elastically supports the PMR writer, wherein the suspension has a flexure to which the PMR writer is joined, a load beam with one end connected to the flexure, and a base plate connected to the other end of the load beam.

10. A magnetic recording apparatus, comprising:

(a) the HGA of claim 9;

(b) a magnetic recording medium positioned opposite to a slider on which the PMR writer is formed;

(c) a spindle motor that rotates and drives the magnetic recording medium; and (d) a device that supports the slider, and that positions the slider relative to the magnetic recording medium.

11. A perpendicular magnetic recording (PMR) writer having a spin transfer torque reversal assisted magnetic recording (STRAMR) structure, comprising:

(a) a main pole (MP) that is configured to generate a magnetic (write) field which is directed through a MP pole tip at an air bearing surface (ABS), and to generate a write gap (WG) field in a down-track direction between a MP trailing side and a trailing shield, and across the WG and a STRAMR device;

(b) the trailing shield (TS) with a side at the ABS, and a bottom surface facing the MP trailing side; and (c) the STRAMR device having a top surface contacting the TS bottom surface, and a bottom surface adjoining the MP trailing side, and a ppL2/FCL2/pxL2/RL1/ppL1/FCL1/pxL1 configuration, comprising:

(1) a first non-spin polarization preserving layer (pxL1) that contacts the TS bottom surface, and that effectively randomizes a spin orientation of electrons flowing through pxL1;

(2) a first flux change layer (FCL1) with a first magnetization substantially parallel to the WG field in the absence of a direct current (DC) and having a top surface that contacts pxL1;

(3) a first spin polarization preserving layer (ppL1) that adjoins a FCL1 bottom surface and that effectively retains a spin orientation of electrons flowing through ppL1;

(4) a first reference layer (RL1) with a second magnetization that is substantially parallel to the WG field;

(5) a second non-spin polarization preserving layer (pxL2) contacting a RL1 bottom surface, and that effectively randomizes a spin orientation of electrons flowing through pxL2;

(6) a second flux change layer (FCL2) adjoining a pxL2 bottom surface and having a third magnetization substantially parallel to the WG field in the absence of DC; and (7) a second spin polarization preserving layer (ppL2) contacting a FCL2 bottom surface and that effectively retains a spin polarization of electrons flowing through ppL2, and wherein the STRAMR device is configured so that when a DC of sufficient magnitude is applied from the MP to TS across the STRAMR device, the first and third magnetizations flip to a direction substantially opposing the WG field thereby increasing reluctance in the WG and enhancing the write field, and wherein the second magnetization, and a fourth magnetization in an adjacent magnetic layer in the form of a portion of the MP or a second reference layer (RL2) remain substantially parallel to the WG field.

12. The PMR writer of claim 11 wherein a bottom surface of ppL2 contacts the MP trailing side, and a portion of the MP proximate to the MP trailing side is the adjacent magnetic layer.

13. The PMR writer of claim 11 wherein the STRAMR device is further comprised the RL2 formed on the MP trailing side and adjoining a bottom surface of ppL2, and wherein RL2 is the adjacent magnetic layer.

14. The PMR writer of claim 11 wherein ppL1 and ppL2 are one or more of Cu, Au, Ag, Ru, and Al.

15. The PMR writer of claim 11 wherein each of pxL1 and pxL2 is an alloy or multilayer of one or more of Cr, Ir, NiCr, Ta, W, Pt, Pd, Rh, Ti.

16. The PMR writer of claim 11 wherein each of FCL1, FCL2, and RL1 is comprised of one or more of Fe, Ni, and Co, or alloys thereof with one or more of B, Mo, Cr, Pt, Pd, and W, and wherein RL1 has a magnetization saturation× thickness (Mst) value substantially larger than that of FCL1.

17. The PMR writer of claim 11 wherein each of ppL1, ppL2, pxL1, and pxL2 has a thickness from 1 nm to 4 nm.

18. The PMR writer of claim 11 wherein each of RL1, FCL1, and FCL2 has a thickness from 1 nm to 4 nm.

19. A head gimbal assembly (HGA), comprising:
  (a) the PMR writer of claim 11; and
  (b) a suspension that elastically supports the PMR writer, wherein the suspension has a flexure to which the PMR writer is joined, a load beam with one end connected to the flexure, and a base plate connected to the other end of the load beam.

20. A magnetic recording apparatus, comprising:
  (a) the HGA of claim 19;
  (b) a magnetic recording medium positioned opposite to a slider on which the PMR writer is formed;
  (c) a spindle motor that rotates and drives the magnetic recording medium; and
  (d) a device that supports the slider, and that positions the slider relative to the magnetic recording medium.

21. A method of forming a spin transfer torque reversal assisted magnetic recording (STRAMR) structure, comprising:
  (a) providing a main pole (MP) with a tapered trailing side that extends from an air bearing surface (ABS) plane to a first height (a) where the MP tapered trailing side connects with a MP top surface aligned orthogonal to the ABS plane and having a first dielectric layer formed thereon, and wherein a side gap separates the MP from a side shield on each side of a center plane;
  (b) depositing a STRAMR stack of layers on a top surface of the MP tapered trailing side, first dielectric layer, side gaps, and side shields; the STRAMR stack of layers is bisected by the center plane and comprises:
    (1) a first non-spin polarization preserving layer (pxL1);
    (2) a first flux change layer (FCL1) with a first magnetization saturation×thickness (Mst) value;
    (3) a first spin polarization preserving layer (ppL1);
    (4) a first reference layer (RL1) with a second magnetization Mst value that is substantially larger than the first Mst value;
    (5) a second non-spin polarization preserving layer (pxL2);
    (6) a second flux change layer (FCL2) having a third Mst value substantially less than the second Mst value; and
    (7) a second spin polarization preserving layer (ppL2) to give a pxL1/FCL1/ppL1/RL1/pxL2/FCL2/ppL2 configuration where pxL1 adjoins the MP trailing side, or a ppL2/FCL2/pxL2/RL1/ppL1/FCL1/pxL1 configuration, and where each of ppL1 and ppL2 retain an orientation of spin polarized electrons transiting said layers, and each of pxL1 and pxL2 randomize an orientation of spin polarized electrons transiting said layers;
  (c) patterning the STRAMR stack of layers to form a STRAMR device with two sides that are separated by a cross-track width (w), and depositing a write gap (WG) layer on exposed portions of the side gaps and side shields that are not covered by the patterned STRAMR stack of layers;
  (d) depositing a trailing shield (TS) layer on the patterned STRAMR stack of layers and the WG layer;
  (e) patterning the TS layer and WG to form sides thereon, the TS layer and WG are bisected by the center plane and each has a width w2 where w2>w; and
  (f) depositing a write shield (WS) on the patterned TS layer and on exposed portions of the side shields, wherein each of FCL1, RL1, and FCL2 has a magnetization pointing substantially parallel to a WG field between the MP and TS layer in the absence of an applied current across the STRAMR stack, and wherein the FCL1 and FCL2 magnetizations flip to a direction substantially opposing the WG field when a direct current of sufficient magnitude is applied across the STRAMR stack.

22. The method of claim 21 wherein the STRAMR stack of layers is further comprised of a second reference layer (RL2) contacting ppL2 to give a pxL1/FCL1/ppL1/RL1/pxL2/FCL2/ppL2/RL2 configuration where RL2 contacts a bottom surface of the TS layer.

23. The method of claim 21 wherein the STRAMR stack of layers is further comprised of a second reference layer (RL2) contacting ppL2 to give a RL2/ppL2/FCL2/pxL2/RL1/ppL1/FCL1/pxL1 configuration where pxL1 contacts a bottom surface of the TS layer, and RL2 is on the MP trailing side.

24. The method of claim 21 wherein ppL1 and ppL2 are one or more of Cu, Au, Ag, Ru, and Al.

25. The method of claim 21 wherein each of pxL1 and pxL2 is an alloy or multilayer of one or more of Cr, Ir, NiCr, Ta, W, Pt, Pd, Rh, Ti.

26. The method of claim 21 wherein each of FCL1, FCL2, and RL1 is comprised of one or more of Fe, Ni, and Co, or alloys thereof with one or more of B, Mo, Cr, Pt, Pd, and W.

* * * * *